United States Patent
Dorn

[15] 3,653,555
[45] Apr. 4, 1972

[54] GREASE DISPENSING HEAD
[72] Inventor: Chester Dorn, Spencer, Iowa
[73] Assignee: Superior Manufacturing Company, Spencer, Iowa
[22] Filed: June 19, 1970
[21] Appl. No.: 47,708

[52] U.S. Cl. ...........................................................222/256
[51] Int. Cl. ......................................................G01f 11/00
[58] Field of Search ........................222/256, 380, 383, 494; 137/525

[56] References Cited

UNITED STATES PATENTS

| | | | |
|---|---|---|---|
| 2,650,744 | 9/1953 | Dirksen | 222/383 |
| 1,784,260 | 12/1930 | Walstrom | 222/257 X |
| 3,131,646 | 5/1964 | Parrott | 137/525 X |
| 3,393,840 | 7/1968 | Sundholm | 222/256 X |

Primary Examiner—Robert B. Reeves
Assistant Examiner—Frederick R. Handren
Attorney—Henderson & Strom

[57] ABSTRACT

A grease dispensing head for a miniaturized hand grease gun is provided herein. The grease dispensing head comprises a cylindrical cap having a passage formed upwardly therethrough. A cylinder is transversely mounted on the cap and has a bore formed therethrough which is valved at the forward end and which communicates with the passage. A saddle straddles the cylinder and has a piston secured to the rearward portion; the piston extending forwardly into the bore. The saddle is reciprocated by an actuating handle rotatably secured to the cap and to the forward portion of the saddle. A spring normally retains the piston in said bore rearwardly of the passage.

11 Claims, 6 Drawing Figures

PATENTED APR 4 1972 3,653,555
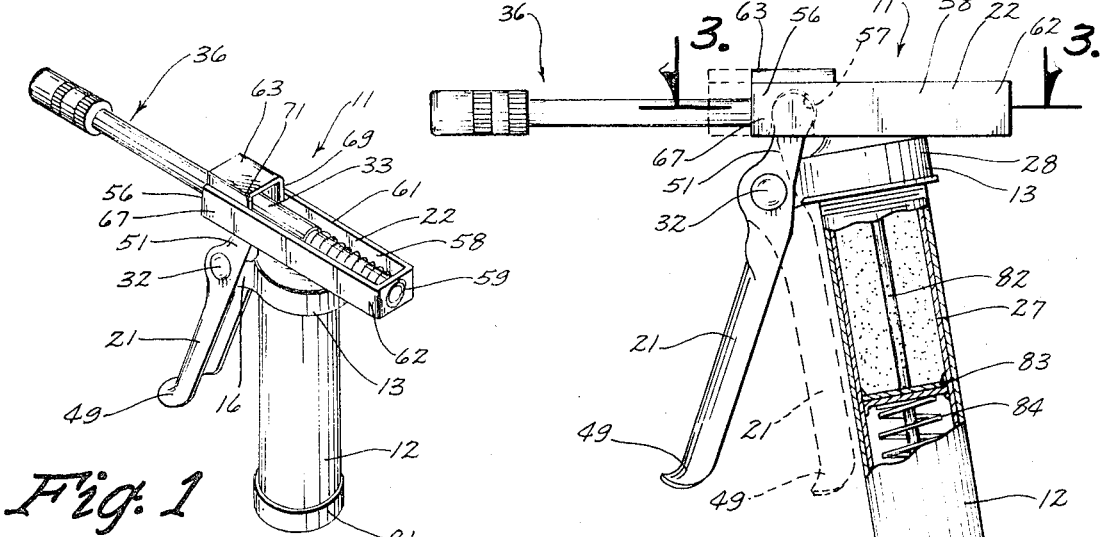
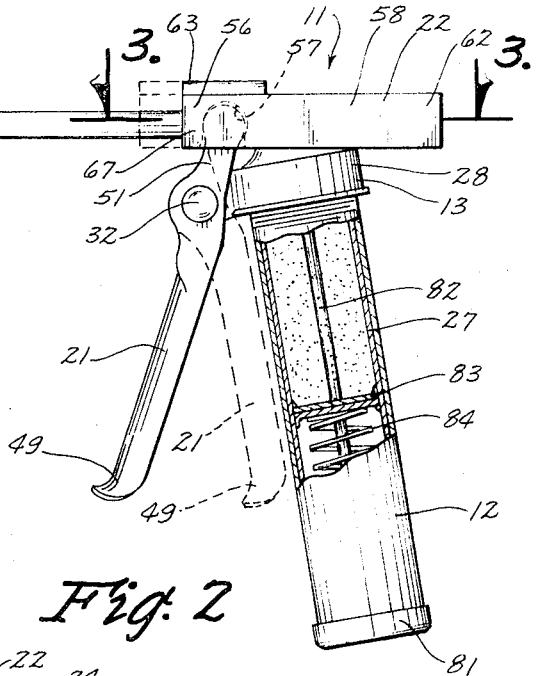
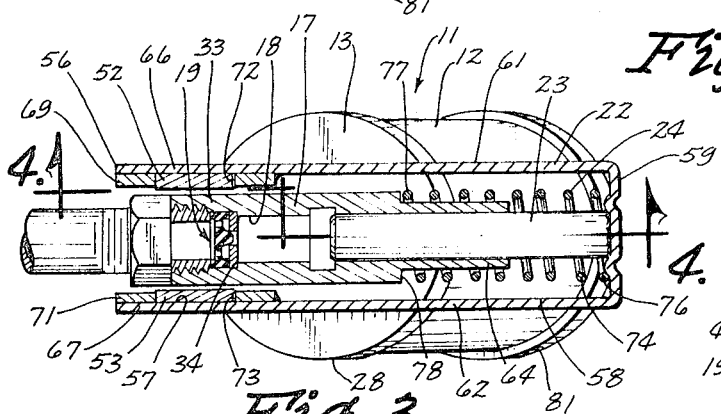
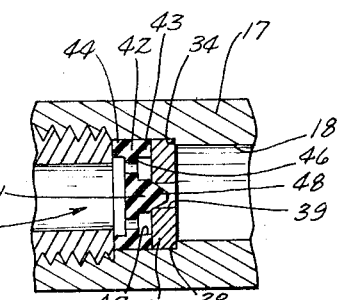
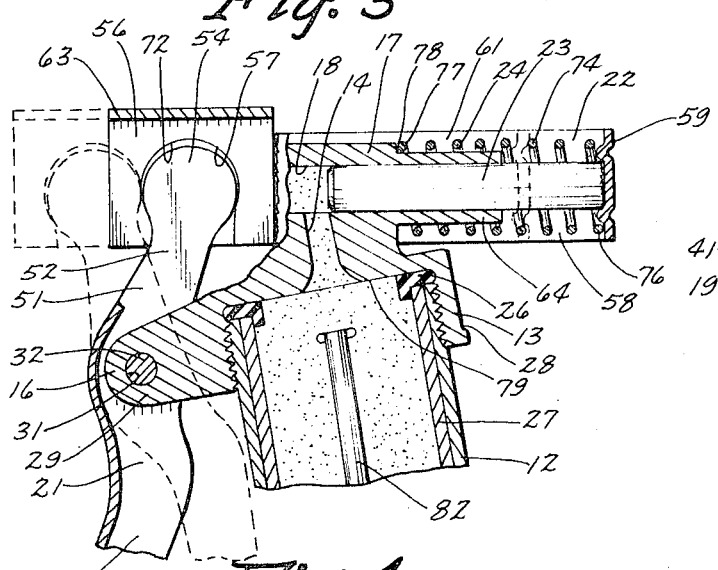
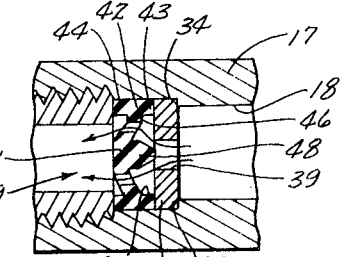
INVENTOR
CHESTER DORN
BY
Henderson & Strom
ATTORNEYS

3,653,555

GREASE DISPENSING HEAD

BACKGROUND OF THE INVENTION

This invention relates to a grease dispensing head for miniaturized hand grease guns. This grease dispensing head is particularly adapted for use in light duty greasing jobs where only small quantities of grease are required.

Grease dispensing heads for small grease guns have been described heretofore in the following U.S. Pat. Nos. Sundholm, 3,393,840; Dirksen, 2,650,744; Sundholm, 3,209,957; Malec, 3,291,350; and Engseth, 2,435,647. These grease dispensing heads and the grease barrels attached thereto have generally been cumbersome and required the use of both hands. In addition, the mechanisms were generally complex, expensive to manufacture and difficult to assemble.

The grease dispensing head of this invention is of simple construction and can be completely assembled with one elongated rivet. This grease dispensing head is essentially trouble free and can be manufactured with a minimum of machining operations.

SUMMARY OF THE INVENTION

This invention relates to a grease dispensing head for a hand grease gun comprising a cylindrical cap having a passage formed upwardly therethrough and, on the external periphery, a forwardly extending handle securing means formed thereon. A cylinder having a bore formed therethrough which communicates with the passage in the cap is transversely mounted on the cap and aligned with the handle securing means. Valve means is secured in the bore forwardly of the passage and an actuating handle is rotatably secured intermediate its ends on the handle securing means. The handle provides a downwardly extending finger grip section and an upwardly extending bifurcated section straddling the cylinder. A saddle also straddles the cylinder and extends rearwardly thereof, the forward portion of the saddle has means formed therein for receiving the bifurcated section of the handle. A piston engages the rearward portion of the saddle and extends forwardly thereof into the bore of the cylinder. A spring normally retains the piston in the bore rearwardly of the passage.

It is a general object of this invention to provide a grease dispensing head for a miniaturized hand grease gun of novel construction.

Another object is to provide a grease dispensing head that can be assembled with a single rivet.

A further object of this invention is to provide a grease dispensing head that has a minimum number of moving parts and which can be manufactured with a minimum number of machining operations.

BRIEF DESCRIPTION OF THE DRAWINGS

FIG. 1 is a perspective view of the grease dispensing head of this invention secured to a grease barrel and a grease applicator pipe.

FIG. 2 is a side view illustrating, in phantom, the movement of the handle and the saddle. A portion of the grease barrel is cut away to illustrate the plunger assembly therein.

FIG. 3 is an enlarged cross-sectional view of the grease dispensing head taken along line 3—3 of FIG. 2.

FIG. 4 is a cross-sectional view of the grease dispensing head with the lower portion of the handle cut away taken along line 4—4 of FIG. 3.

FIG. 5 is a magnified view of the valve means in a closed position.

FIG. 6 is a magnified view of the valve means in an open position.

DESCRIPTION OF THE PREFERRED EMBODIMENTS

Referring now to the drawings, the grease dispensing head of this invention is indicated generally at 11 in FIGS. 1-4 secured on a grease barrel 12. The grease dispensing head 11 comprises a cap 13 having a passage 14 (FIG. 4) formed upwardly therethrough and a forwardly extending handle securing means 16 formed on the external periphery thereof. A cylinder 17 (FIGS. 3-4) having a bore 18 formed therethrough is transversely mounted on the cap 13 and has valve means 19 (FIGS. 3, 5 and 6) secured therein. An actuating handle 21 is rotatably secured on the handle securing means 16 and engages the saddle 22 which straddles the cylinder 17. A piston 23 (FIGS. 3-4) is engaged at the rear of the saddle 22 and extends forwardly into the bore 18. Spring means 24 normally retains the piston 23 in the bore 18 rearwardly of the passage 14.

More specifically, the cap 13 (FIG. 4) is of cylindrical configuration and is internally threaded for securement to the grease barrel 12. A gasket 26 is provided inside the cap 13 to sealingly engage the grease barrel 12 and the cartridge 27 contained therein. A passage 14 is upwardly formed through the cap 13 to allow grease to flow from the barrel 12 into the bore 18. On the external periphery 28 of the cap 13, a forwardly extending handle securing means 16 is formed. As shown in FIG. 4, this means 16 is generally a lug 29 having a hole 31 formed therethrough. The handle 21 is rotatably secured to this lug 29 by an elongated rivet 32 (FIGS. 1 and 2) extending through the handle 21 and the lug 29.

A cylinder 17 (FIGS. 3-4) having a bore 18 formed therethrough is transversely mounted on the cap 13 and aligned with the handle securing means 16. The cylinder 17 is mounted at a small acute angle to the cap 13 with the forward end 33 (FIGS. 1 and 3) of the cylinder 17 being slightly raised. The bore 18 communicates with the passage 14 to allow grease to flow from the barrel 12 into the bore 18.

The forward end 33 (FIGS. 3, 5 and 6) of the cylinder 17 has a slightly larger bore thereby forming a forwardly facing shoulder 34. This shoulder 34 acts as a support for the valve means 19. The forward end 33 of the cylinder 17 proximate the shoulder 34 is tapped to receive a threaded grease pipe assembly 36 which secures the valve means 19 against the shoulder 34.

The valve means 19 secured between the shoulder 34 and the grease pipe assembly 36 can be of conventional type comprising a steel ball and a coil spring (not shown) as illustrated in Sundholm, U.S. Pat. No. 3,393,840. However, it is preferred that the valve shown in FIGS. 5 and 6 and fully explained in the copending application of Dorn, Ser. No. 22,306, filed Mar. 24, 1970, entitled Positive Displacement Valve for Grease Guns, be utilized herein in conjunction with a valve retainer 37.

The valve means 19 comprises a circular valve retainer 37 adapted to abut the forward portion 38 of the shoulder 34. A bore 39 is formed through the valve retainer 37 and has a diameter less than the diameter of the bore 18 through the cylinder 17. The valve 41 is formed from resilient material and is generally integrally formed. The valve 41 comprises an outer member 42 of cylindrical configuration having a rearward edge 43 and a forward edge 44. The forward edge 44 is engaged by the grease pipe assembly 36 and the rearward edge 43 is engaged by the valve retainer 37. A web 46 extends inwardly of the outer member 42 and is secured to the inside surface 47 of the outer member 42. A stop 48 is formed on the web 46 centrally of the outer member 42 and extends rearwardly into the bore 39 formed in the valve retainer 37 and rearwardly of the rearward edge 43 of the outer member 42. This valve 41 is explained in detail in the application previously cited, the disclosure of which being incorporated herein by reference.

When the piston 23 is moved forwardly, pressure builds up in the bore 18 until the valve 41 is forced open (FIG. 6) which allows grease to flow through the perforations 45 formed in the web 46. When the piston 23 is moved rearwardly, a partial vacuum is formed in the bore 18 and the valve 41 is closed (FIG. 5).

An actuating handle 16 (FIGS. 2-4) is rotatably secured intermediate its ends 49 and 51 by a rivet 32 to the handle securing means 16. The lower end 49 of the handle 16 is a downwardly extending finger grip section having a generally U-shaped cross-section with the bottom of the U directed outwardly to provide a smooth surface for the fingers. The finger grip section 49 extends downwardly along the barrel 12 and its position with respect to the barrel 12 varies as the piston 23 moves forwardly and rearwardly in the bore 18. The lower end 49 of the handle 16 is biased to a forward position by spring means 24 as shown in FIG. 4.

The upper end 51 of the handle 16 is bifurcated and straddles the cylinder 17. The upper end 51 comprises two arms 52 and 53 (FIGS. 3 and 4) which straddle the cylinder 17. The topmost portions 54 of the arms 52 and 53 are of arcuate configuration and slidingly fit into the saddle 22. These arms 52 and 53 are parallelly disposed at substantially right angles to the periphery 28 of the cap 13.

When the lower end 49 of the handle 16 is pulled rearwardly, the saddle 22 moves forwardly as does the piston 23, and the spring means 24 is compressed. When the lower end 49 of the handle 16 is released, the spring means 24 forces the piston 23 and saddle 22 rearwardly and returns the lower end 49 of the handle 16 to its original position. Of course, grease is forced out of the grease gun during the forward stroke of the piston 23 and the bore 18 is refilled with grease on the return stroke.

A saddle 22 (FIGS. 3-4) straddles the cylinder 17 and extends rearwardly of the cylinder 17. The forward portion 56 of the saddle 22 has means 57 formed therein for receiving the bifurcated end 51 of the handle 16.

Specifically, the saddle 22 as illustrated in FIGS. 3 and 4 comprises a U-shaped member 58 having a base 59 and two legs 61 and 62, and a top member 63. The base 59 is disposed rearwardly of the rearward end 64 of the cylinder 17 and the legs 61 and 62 are longitudinally aligned with the cylinder 17. The top member 63 is utilized to secure the free ends 66 and 67 of the legs 61 and 62 together and extends between the uppermost portions 68 thereof. Preferably, this top member 63 is also of U-shaped configuration with the legs 69 and 71 extending downwardly along the inside surfaces of the legs 61 and 62 of the first U-shaped member 58. The legs 69 and 71 have cut-outs 72 and 73 formed therein for receiving the topmost portions 54 of the arms 52 and 53. The cut-outs 72 and 73 are of generally the same arcuate configuration as the topmost portion 54 of the arms 52 and 53.

A piston 23 (FIGS. 3-4) engages the base 59 of the first U-shaped member 58 and extends forwardly thereof into the bore 18 of the cylinder 17. Preferably, the piston 23 is rigidly secured, as by welding, to the base 59 of the U-shaped member 58. The piston 23 is machined to slidingly fit within the bore 18. Additionally, the piston 23 helps to maintain the saddle 22 in the correct position relative to the cylinder 17.

Spring means 24 is utilized to normally retain the piston 23 in the bore 18 rearwardly of the passage 14. The spring means 24 is generally a coil spring 74 having two ends 76 and 77 which encircles the piston 23. One end 76 of the spring 74 bears against the base 59 of the U-shaped member 58 and the other end 77 generally bears against a rearwardly facing shoulder 78 formed on the rearward end 64 of the cylinder 17.

This dispensing head 11 is readily and quickly assembled. The coil spring 74 is disposed over the piston 23. The piston 23 with the saddle 22 attached thereto is inserted into the bore 18. The spring 74 is partially compressed by forcing the saddle 22 forwardly. The topmost portions 54 of the arms 52 and 53 are slipped into the cut-outs 72 and 73 in the legs 69 and 71 and, finally, the rivet 32 secures the handle 21 to the handle securing means 16. The valve retainer 37 and the valve 41 are then inserted into the forward end 33 of the bore 18. The entire dispensing head 11 is secured together by the single rivet 32.

To complete the grease gun, a grease pipe assembly 36 is threadably secured in the forward end 33 of the cylinder 17 and abuts the valve 41 in the bore 18. The grease pipe assembly 36 is of conventional configuration and manufacture.

The grease barrel 12 (FIG. 2) is threadably secured to the cap 13. The barrel 12 is of cylindrical configuration and has an open top 79. The lower end 81 of the barrel 12 can be permanently sealed as shown. A guide rod 82 extends through the barrel 12 and a plunger 83 is slidably mounted thereon. The plunger 83 is urged toward the dispensing head 11 by coil spring 84. The barrel 12 is adapted to use a cartridge 27 or bulk-filled grease.

Although a preferred embodiment has been described, it is to be understood that various modifications may be made without departing from the invention as defined in the appended claims.

I claim:

1. A dispensing head for a hand grease gun comprising:
   a cylindrical cap having a passage formed upwardly therethrough, said cap having formed on the external periphery thereof a forwardly extending handle securing means;
   a cylinder having a bore formed therethrough transversely mounted on said cap and aligned with said handle securing means, said bore communicating with said passage formed in said cap;
   valve means secured in said bore forwardly of said passage;
   an actuating handle rotatably secured intermediate its ends on said handle securing means, said handle providing a downwardly extending finger grip section and an upwardly extending bifurcated section straddling said cylinder;
   a saddle comprising a U-shaped member having a base and two legs, said legs being longitudinally aligned with said cylinder, said base being disposed rearwardly of said cylinder and secured to said piston, the forward portion of said saddle having means formed therein for receiving said bifurcated section of said handle, said bifurcated section of said handle being secured in said means;
   a piston engaging the rearward portion of said saddle and extending forwardly thereof into said bore of said cylinder; and
   spring means normally retaining said piston in said bore rearwardly of said passage.

2. The dispensing head of claim 1 wherein said saddle includes
   a top member secured between the uppermost portions of said legs proximate the free ends thereof.

3. The dispensing head of claim 2 wherein the forward end of said cylinder is tapped to receive a threaded grease pipe.

4. The dispensing head of claim 3 wherein said spring means is a coil spring having two ends, said coil spring encircling said piston with one of said ends bearing against said base of said U-shaped member and the other of said ends bearing against said cylinder.

5. The dispensing head of claim 4 wherein said handle securing means is a forwardly extending lug.

6. The dispensing head of claim 5 wherein said upwardly extending bifurcated section comprises two upwardly extending, parallelly disposed arms, the topmost portion of said arms being of arcuate configuration; said arms being disposed at substantially right angles to the periphery of said cap.

7. The dispensing head of claim 6 wherein arm receiving cut-outs are formed in the free ends of said legs for receiving the arcuate topmost portions of said arms.

8. The dispensing head of claim 7 wherein a forwardly facing shoulder is formed in said bore of said cylinder proximate the forward end of said cylinder and proximate said tapped portion of said cylinder.

9. The dispensing head of claim 8 wherein said valve means comprises:
   a circular valve retainer adapted to abut the forward portion of said shoulder and having a bore formed therethrough, said bore in said valve retainer being of lesser diameter than said bore through said cylinder; and
   a resilient, one piece valve comprising an outer member of cylindrical configuration having a rearward edge and a forward edge and formed from resilient material; a web formed from resilient material and having perforations formed therethrough, said web extending inwardly of said outer member and secured to the inside surface of said outer member, a stop formed on said web centrally of said cylindrical outer member, said stop extending rearwardly of the rearward edge of said outer member and extending into said bore formed through said valve retainer.

10. The dispensing head of claim 9 wherein a rearwardly facing shoulder is formed externally of said cylinder on the rearward portion of said cylinder and adapted to secure the forward end of said coil spring and wherein the lower portion of said cap is internally threaded for engagement with a grease barrel.

11. In a miniaturized hand grease gun, the combination comprising:
  a cylindrical barrel having an open upper end, said barrel having an outside diameter dimensioned to be gripped in the cleft of one hand between the thumb and forefinger;
  a grease dispensing head mounted on the upper end of said barrel, said dispensing head comprising:
    a cylindrical cap having a passage formed upwardly therethrough, said cap having formed on the external periphery thereof a forwardly extending handle securing means;
    a cylinder having a bore formed therethrough transversely mounted on said cap and aligned with said handle securing means, said bore communicating with said passage formed in said cap;
    valve means secured in said bore forwardly of said passage;
    an actuating handle rotatably secured intermediate its ends on said handle securing means, said handle providing a downwardly extending finger grip section and an upwardly extending bifurcated section straddling said cylinder;
    a saddle comprising a U-shaped member having a base and two legs, said legs being longitudinally aligned with said cylinder, said base being disposed rearwardly of said cylinder and secured to said piston, the forward portion of said saddle having means formed therein for receiving said bifurcated section of said handle, said bifurcated section of said handle being secured in said means,
    a piston engaging the rearward portion of said saddle and extending forwardly thereof into said bore of said cylinder;
  spring means normally retaining said piston in said bore rearwardly of said passage; and
  a grease application pipe assembly threadably secured in the forward end of said cylinder and abutting said valve means.

* * * * *